(12) United States Patent
Gasahl, IV et al.

(10) Patent No.: US 10,676,045 B1
(45) Date of Patent: Jun. 9, 2020

(54) VEHICLE ASSEMBLY

(71) Applicant: Nissan North America, Inc., Franklin, TN (US)

(72) Inventors: George Henry Gasahl, IV, Farmington Hills, MI (US); Brian Haupt, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 16/206,061

(22) Filed: Nov. 30, 2018

(51) Int. Cl.
*B60R 13/02* (2006.01)
*B60N 2/75* (2018.01)
*B60J 5/04* (2006.01)

(52) U.S. Cl.
CPC ......... *B60R 13/0206* (2013.01); *B60J 5/0413* (2013.01); *B60N 2/78* (2018.02); *B60R 13/0243* (2013.01)

(58) Field of Classification Search
CPC ... B60R 13/0206; B60R 13/0243; B60N 2/78; B60J 5/0413
USPC ....................................................... 296/153
See application file for complete search history.

(56) References Cited

U.S. PATENT DOCUMENTS

| | | | |
|---|---|---|---|
| 4,783,114 A | 11/1988 | Welch | |
| 5,445,430 A | 8/1995 | Nichols | |
| 5,527,084 A * | 6/1996 | Scherf | B60R 21/0428 296/153 |
| 6,568,743 B1 * | 5/2003 | Jayasuriya | B60N 2/42727 296/153 |
| 6,983,967 B2 * | 1/2006 | Scheidmantal | B60N 2/75 296/1.09 |
| 7,156,437 B2 * | 1/2007 | Cowelchuk | B60R 13/02 296/1.08 |
| 7,503,621 B2 * | 3/2009 | Mani | B60R 21/0428 226/153 |
| 7,681,939 B2 | 3/2010 | Augustyn | |
| 9,592,721 B1 | 3/2017 | Kelly et al. | |
| 2007/0246925 A1 | 10/2007 | Mani | |

* cited by examiner

*Primary Examiner* — Joseph D. Pape
(74) *Attorney, Agent, or Firm* — Global IP Counselors, LLP (57) ABSTRACT

A trim panel is attached to an inboard surface of a door structure and includes an armrest and an armrest retaining structure. A portion of the trim panel defines an armrest opening with the armrest installed through the armrest opening. The armrest has an outboard portion with an outer peripheral flange that overlays a portion of an outboard surface of the trim panel. The armrest retaining structure is attached to the outboard surface of the trim panel at location adjacent to the armrest opening. The armrest retaining structure retains the armrest in position relative to the trim panel. The armrest retaining structure is further configured to release the armrest for movement in an outboard direction upon application of a predetermined first level of force to the armrest.

19 Claims, 6 Drawing Sheets

VEHICLE ASSEMBLY

BACKGROUND

Field of the Invention

The present invention generally relates to a vehicle assembly with a door that includes an armrest. More specifically, the present invention relates to a door with an armrest, where the armrest is configured to move in an outboard direction in response to a side impact event.

Background Information

Vehicles are configured with many features that strengthen a vehicle body structure of the vehicle. Such features can reduce movement of a door in an inboard direction in response to a side impact event.

SUMMARY

One object of the present disclosure, is to provide an armrest of a door of a passenger vehicle with a breakaway feature such that in response to an impact event where the door and the armrest are moved in an inboard direction such that the armrest makes contact with an object or passenger within the vehicle, the armrest breaks away and moves in an outboard direction into a portion of the door.

In view of the state of the known technology, one aspect of the present disclosure is to provide a vehicle assembly with an inner door panel, an outer door panel, a trim panel, an armrest and armrest retaining structure. The outer door panel is fixed along at least a portion of an outer periphery thereof to an outer periphery of the inner door panel. The trim panel is attached to an inboard surface of the inner door panel. The trim panel has an outboard surface and an inboard surface. The outboard surface faces the inboard surface of the inner door panel. A portion of the trim panel defines an armrest opening that extends from the outboard surface to the inboard surface of the trim panel. The armrest has a main body that includes an inboard portion and an outboard portion. The inboard portion is inserted through the armrest opening from an outboard surface of the trim panel with the inboard portion of the main body extending inboard from the inboard surface of the trim panel. The inboard portion of the arm rest has an arm supporting surface located inboard of the inboard surface of the trim panel. The outboard portion has an outer peripheral flange that overlays a portion of the outboard surface of the trim panel. The armrest retaining structure is attached to the outboard surface of the trim panel at location adjacent to the armrest opening. The armrest retaining structure retains the armrest in position relative to the trim panel. The armrest retaining structure is further configured to release the armrest for movement in an outboard direction upon application of a predetermined first level of force to the armrest.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
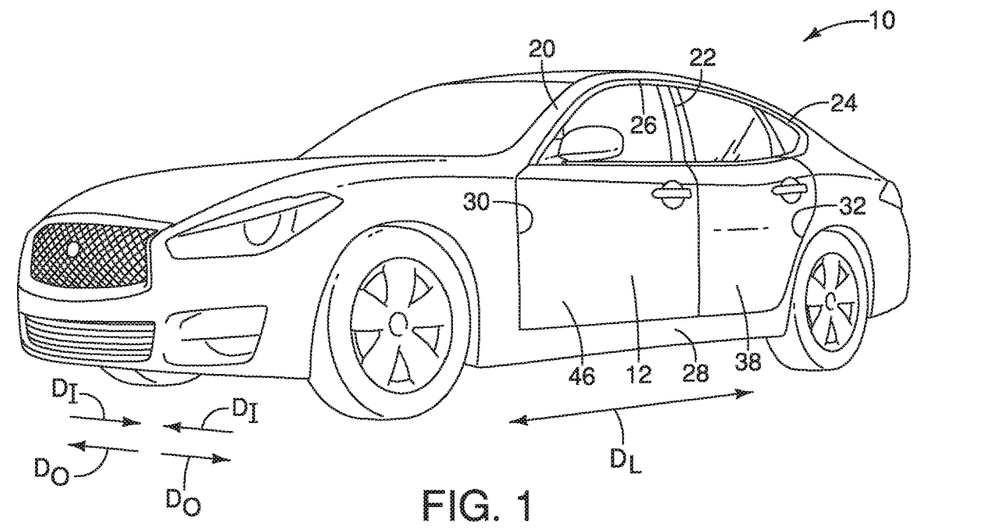
FIG. 1 is a perspective view of a vehicle that includes a door with an armrest in accordance with a first embodiment.
Figure 2:
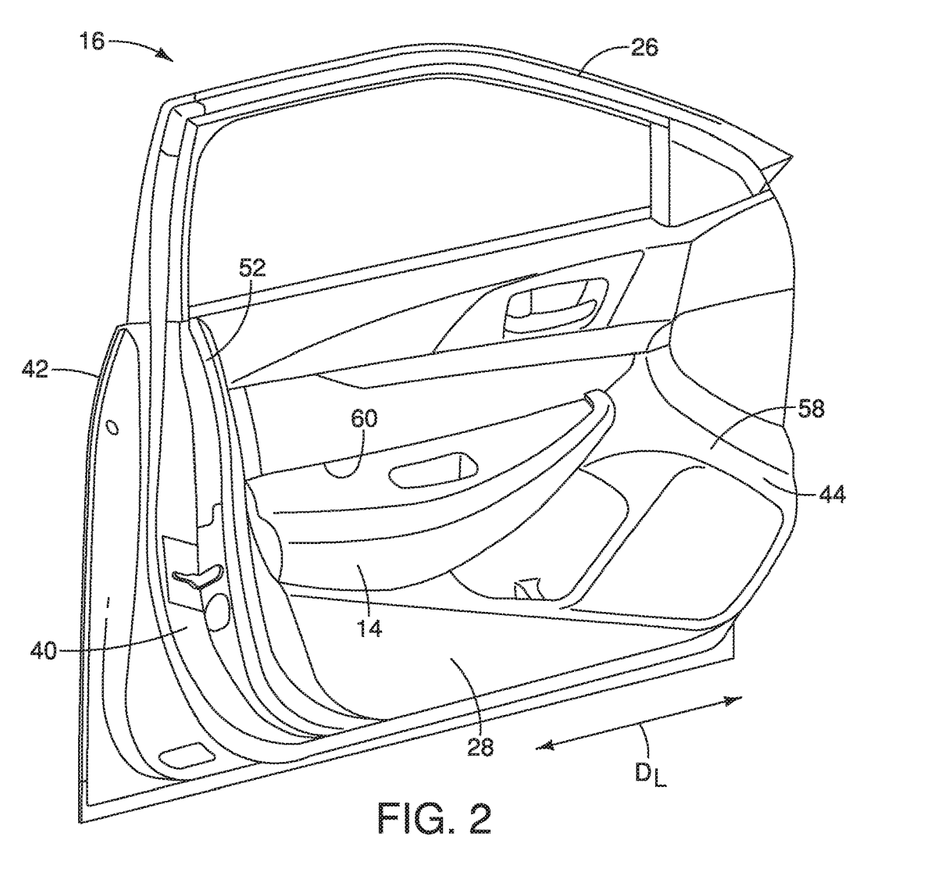
FIG. 2 is a perspective view of the door removed from the vehicle showing the armrest in accordance with the first embodiment.

Referring initially to FIGS. 1 and 2, a vehicle 10 having a door 12 that includes an armrest 14 is illustrated in accordance with a first embodiment. The armrest 14 is configured such that during a side impact event with impact energy being applied to an outer surface of the door 12, impact energy from the impact event is transmitted through the door 12 and can cause the door 12 to move and/or deform in a vehicle inboard direction $D_I$. If the armrest 14 contacts an object as the door 12 moves in the vehicle inboard direction $D_I$, the armrest 14 is configured to break-away from an interior surface of the door 12 and move in a vehicle outboard direction $D_O$ and at least partially into a hollow interior 16 of the door 12, as is described in greater detail below.

As shown in FIG. 1, the vehicle 10 has a vehicle body structure 18 that includes at least an A-pillar 20, a B-pillar 22, a C-pillar 24, a roof rail 26 and a sill structure 28. The A-pillar 20, the B-pillar 22, a forward section of the roof rail 26 and a forward section of the sill structure 28 together surround and define a front door opening 30. The B-pillar 22, the C-pillar 24, a rearward section of the roof rail 26 and a rearward section of the sill structure 28 together surround and define a rear door opening 32. As shown in FIG. 1, the vehicle 10 and the vehicle body structure 18 define a vehicle longitudinal direction $D_L$, the vehicle inboard directions $D_I$ and the vehicle outboard directions $D_O$. The vehicle longitudinal direction $D_L$ is defined as a direction relative to the length of the vehicle 10 or directions parallel to the length of the vehicle 10 (front to back and/or back to front). The vehicle inboard directions $D_I$ are defined as directions facing the center of the vehicle 10 from laterally outboard locations, or movement laterally inboard toward the center of the vehicle 10. The vehicle outboard directions $D_O$ are defined as directions facing away from the center of the vehicle 10 or movement laterally outboard away from the center of the vehicle 10.

As shown removed from the vehicle 10, the vehicle 10 further includes the door 12 (also referred to as the front door 12) and a rear door 38 (FIG. 1). The front door 12 is pivotally installed to the A-pillar 20 of the vehicle body structure 18 via hinges H (FIG. 4), in a conventional manner, such that the front door 12 covers the front door opening 30 in a closed orientation, as shown in FIG. 1. In the closed orientation, the front door 12 spans the front door opening 30 from the A-pillar 20 to the B-pillar 22. Similarly, the rear door 38 is pivotally installed to the B-pillar 22 of the vehicle body structure 18 via hinges H (FIG. 4), in a conventional manner, such that the rear door 38 covers the rear door opening 32 in a closed orientation, as shown in FIG. 1. In the closed orientation, the rear door 38 spans the rear door opening 32 from the B-pillar 22 to the C-pillar 24.

In a first embodiment depicted in FIGS. 1-7, one, or, both of the front door 12 and the rear door 38 can include the armrest 14. For the sake of brevity, the inclusion of the armrest 14 within the front door 12 is depicted and described herein below. However, it should be understood from the drawings and the description herein below, that the rear door 38 can also be provided with the armrest 14. Therefore, description of the front door 12 and the armrest 14 is equally applicable to the rear door 38.

Figure 3:
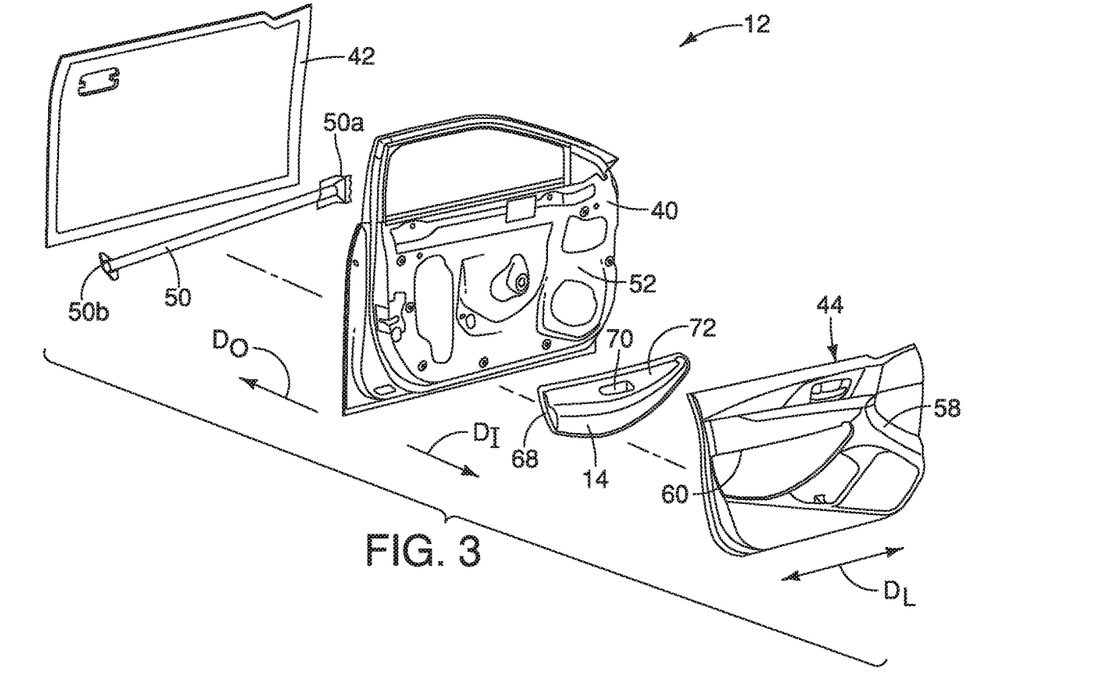
FIG. 3 is an exploded view of the door showing an inner panel, an outer panel, a guide bar, a trim panel and the armrest in accordance with the first embodiment.
Figure 4:
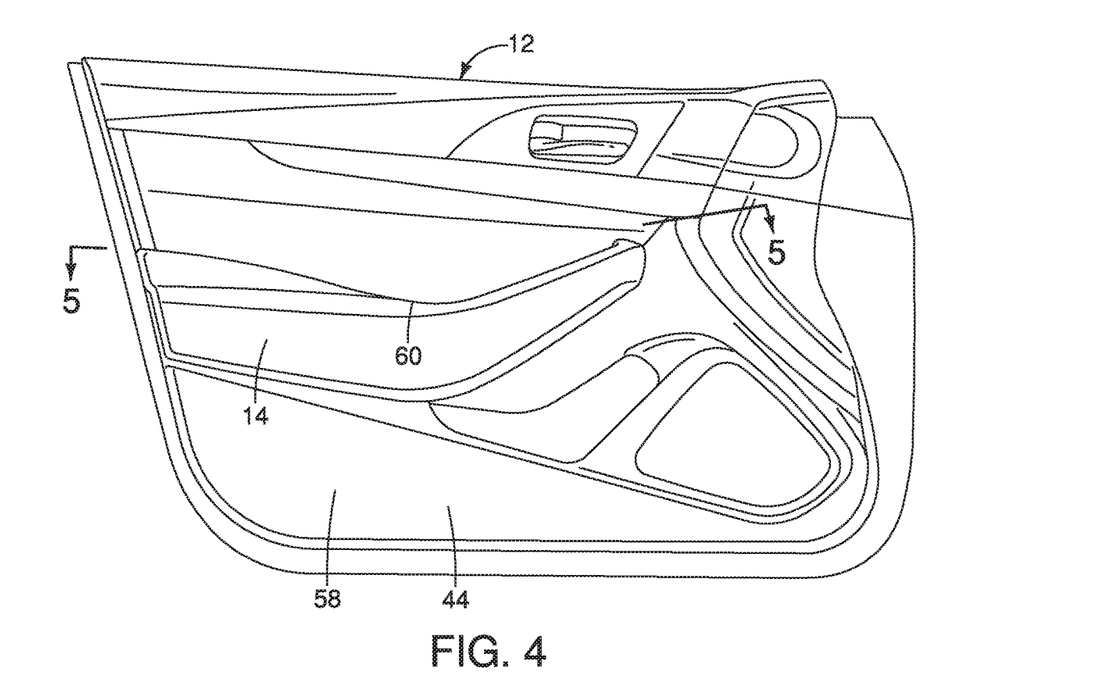
FIG. 4 is plan view of an inboard surface of the door showing the armrest installed thereto in accordance with the first embodiment.

As shown in FIGS. 3-4, the front door 12 includes, among other features and elements, an inner door panel 40 (hereinafter the inner panel 40), an outer door panel 42 (hereinafter the outer panel 42), an interior trim panel 44 (hereinafter the trim panel 44) and the armrest 14. The outer panel 42 defines a lateral exterior side surface 46 (outboard or outer surface). The door 12 further defines a hollow interior 48 within the front door 12 between the inner panel 40 and the outer panel 42.

The inner panel 40 and the outer panel 42 are fixedly attached to one another along respective forward edges, rearward edges and lower edges thereof in a conventional manner. More specifically, the inner panel 40 and the outer panel 42 are fixed to one another along at least a portion of an outer periphery of the inner panel 40 and an outer periphery of the outer panel 42. The inner panel 40 and the outer panel 42 define the hollow interior 48 therebetween. The respective forward, rearward and lower edges (peripheral edges) of each of the inner panel 40 and the outer panel 42 can be welded together forming a rigid attachment therebetween in a conventional manner. Since attachments between inner and outer panels of vehicle doors are conventional constructs well known in the art, further description is omitted for the sake of brevity.

Figure 5:
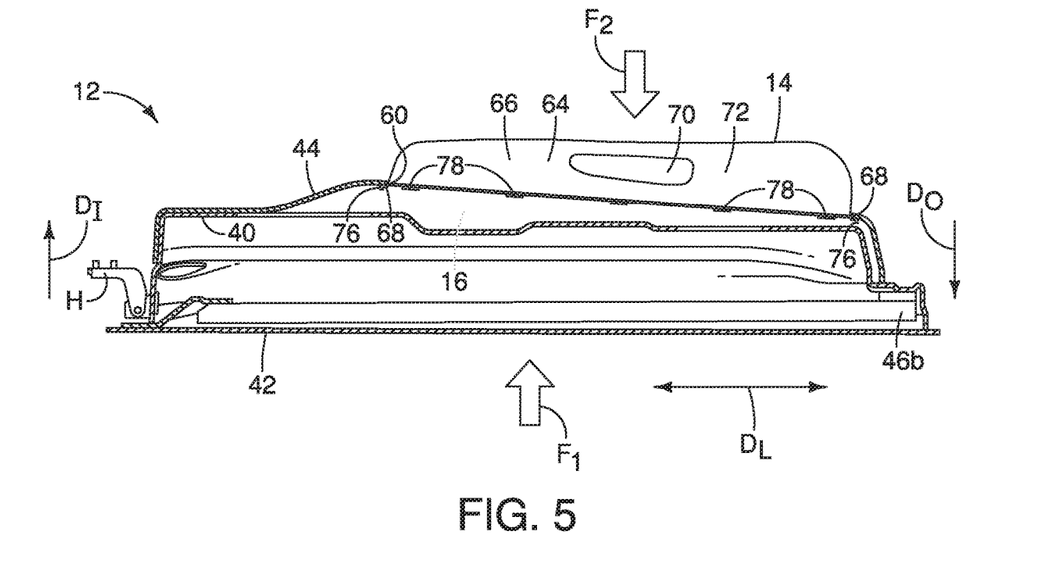
FIG. 5 is a cross-sectional view of the door taken along the line 5-5 in FIG. 4, showing the inner panel, the outer panel, the guide bar, the trim panel and the armrest in accordance with the first embodiment.
Figure 6:
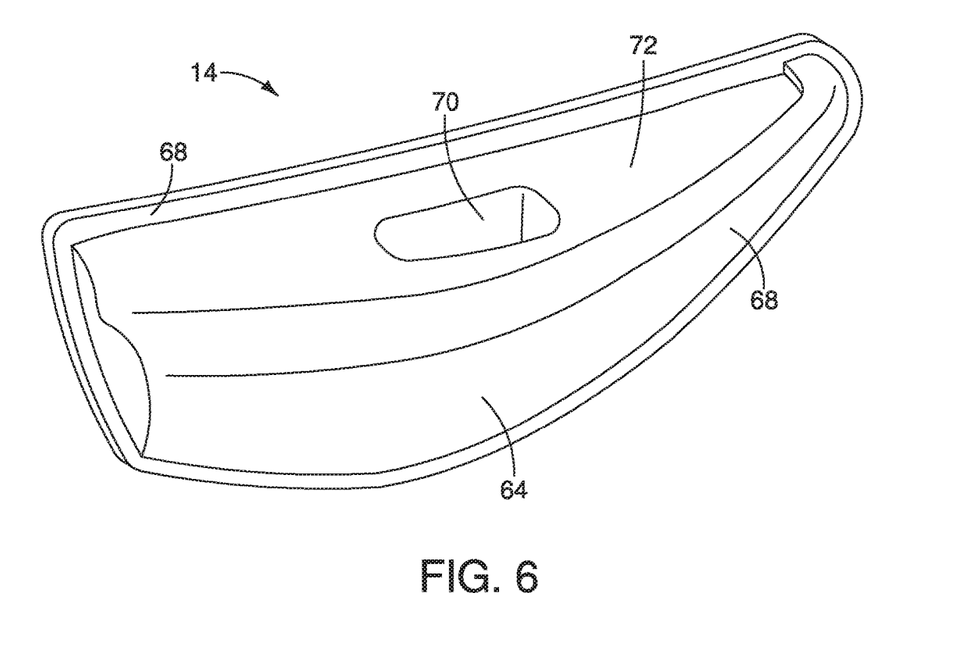
FIG. 6 is a perspective view of the armrest removed from the door showing a flange that extends around an outer periphery of the armrest in accordance with the first embodiment.

The door 12 can further include a structural member 50 that extends approximately parallel to the vehicle longitudinal direction $D_L$ of the vehicle 10 within the hollow interior 48 of the door 12. The structural member 50 is rigidly fixed at a forward end 50a thereof to a forward portion of the inner panel 40 and the outer panel 42, and at a rearward end 50b is rigidly fixed at a rearward end to at least the inner panel 40 adjacent to the outer panel 42, as shown in FIG. 5. The structural member 50 is installed within the hollow interior 48 of the door 12.

It should be understood from the drawings and the description herein that the structural member 50 can be fixed at both forward and rearward ends 50a and 50b to one or both of the inner panel 40 and outer panel 42 within the hollow interior 48. The structural member 50 can be fixedly attached to the inner panel 40 and the outer panel 42 via conventional welding techniques, or via mechanical fasteners. However, in the depicted embodiment, the structural member 50 is fixed to the door 12 by welding techniques.

The structural member 50 is located below an approximate center of the door 12 between a window opening and a lower end of the door 12. The structural member 50 is spaced apart in the inboard direction $D_I$ from the outer panel 42, as shown in FIG. 4. The structural member 50 is a rigid guard rail or beam that provides further rigidity and structural integrity to the overall structure of the door 12 in the event of a side impact event.

As shown in FIGS. 2-5, the trim panel 44 is attached to an inboard surface 52 of the inner door panel 42. The trim panel 44 has an outboard surface 56 and an inboard surface 58. The outboard surface 56 faces the inboard surface 52 of the inner door panel 40. A central portion of the trim panel 44 defines an armrest opening 60 that extends from the outboard surface 56 to the inboard surface 58 of the trim panel 44.

Referring now to FIGS. 3-9, the armrest 14 has a main body 64 that includes an inboard portion 66 and an outboard portion 68. The inboard portion 66 includes a handle opening 70 and is dimensioned to conform to the overall shape of the arm rest opening 60. Specifically, the inboard portion 66 is dimensioned and shaped to fit through the armrest opening 60, being inserted from the outboard surface 56, through the armrest opening 60 and extend through the armrest opening inboard away from the inboard surface 58 of the trim panel 44. The inboard portion 66 of the armrest 14 has an arm supporting surface 72 located inboard of the inboard surface 58 of the trim panel 44.

The outboard portion 68 of the armrest 14 is an outer peripheral flange (referred to as the flange 68). The flange 68 is larger than the armrest opening 60 and therefore overlays a portion of the outboard surface 56 of the trim panel 44 once the armrest 14 is installed to the trim panel 44, as shown in FIGS. 5, 7 and 8.

During assembly of the trim panel 44, the inboard portion 66 is inserted through the armrest opening 60 from the outboard surface 56 of the trim panel 44 with the inboard portion 66 of the main body 64 of the armrest 14 extending inboard from the inboard surface 58 of the trim panel 44.

Figure 7:
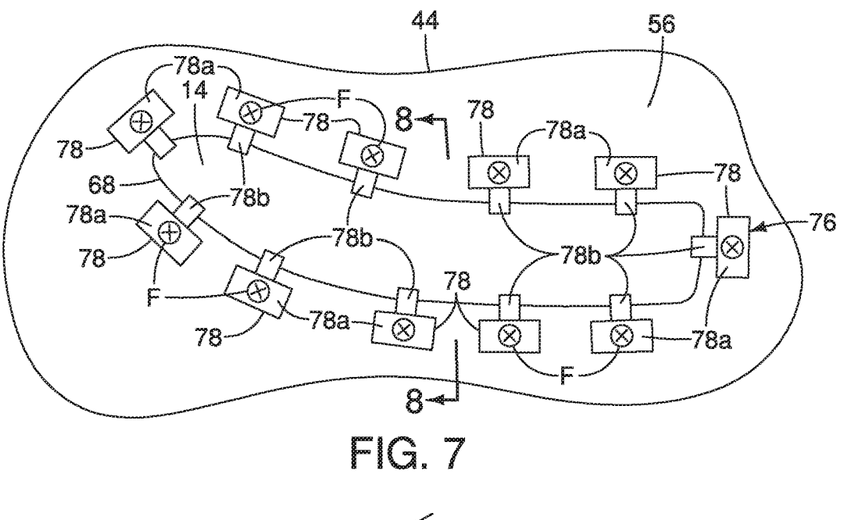
FIG. 7 is a plan view of an outboard surface of the trim panel showing an armrest retaining structure retaining the flange of the armrest, the armrest retaining structure being defined by a plurality of retaining elements, in accordance with the first embodiment.
Figure 8:
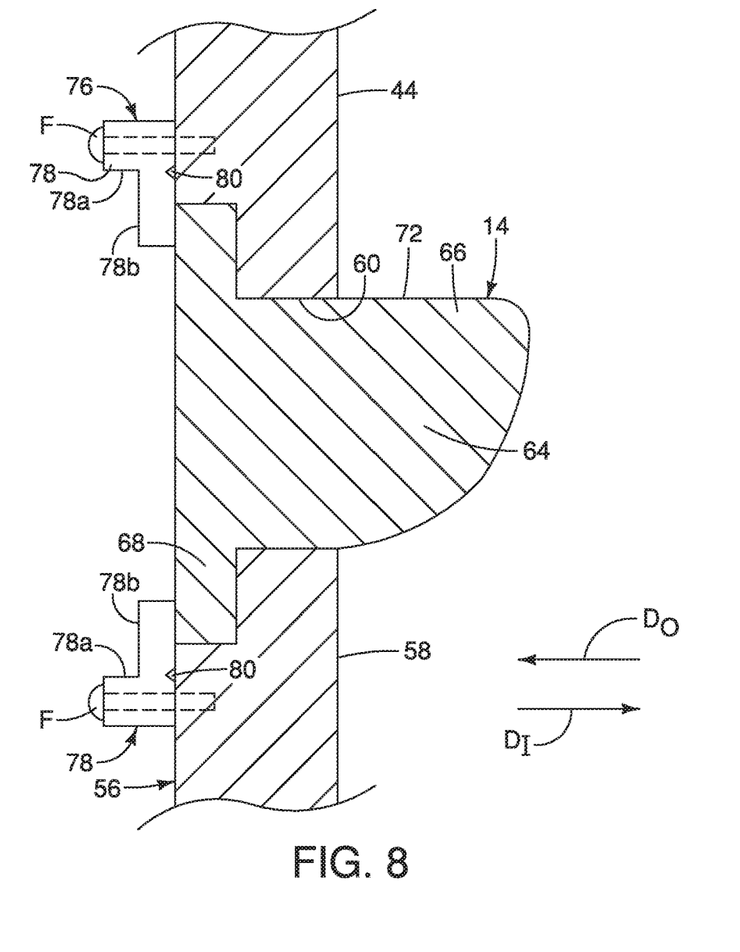
FIG. 8 is a cross-sectional view of a portion of the door taken along the line 8-8 in FIG. 7, showing the trim panel, the armrest and the retaining elements of the armrest retaining structure with the armrest in a non-impacted orientation in accordance with the first embodiment.

As shown in FIGS. 7 and 8, the armrest 14 is attached to the trim panel 44 and fixed in place by an armrest retaining structure 76 that attaches to the outboard surface 56 of the trim panel 44 at locations adjacent to the armrest opening 60. The armrest retaining structure 76 retains the armrest in position relative to the trim panel 44. The armrest retaining structure 76 is further configured to release the armrest 14 for movement in the outboard direction $D_O$ upon application of a predetermined first level of force to the armrest 14, as shown in FIG. 9.

The armrest retaining structure 76 includes a plurality of retaining elements 78. Each of the plurality of retaining elements 78 is fixed to the outboard surface 56 of the trim panel 44. Each of the retaining elements 78 includes an attachment block 78a (a first portion) and a projection 78b (a second portion). The attachment block 78a is fixed to the trim panel 44 by a mechanical fastener F or heat welding. The projection 78b extends over the flange 68 of the armrest 14 and overlays at least a portion of the flange 68 of the armrest 14. More specifically, each of the projections 78b extends toward the armrest opening 60 contacting a corresponding portion of the flange 68 of the armrest 14. As shown in FIG. 7, the retaining elements 78 are spaced apart from one another around the flange 68 of the armrest 14.

Each of the retaining elements 78 includes a breakaway feature 80. The breakaway feature 80 is depicted in FIG. 8 as a V-shaped notch. The notches that define the breakaway feature 80 have a reduced overall thickness relative to a remainder of the retaining element 78, the remainder being the attachment block 78a. In a non-impacted orientation shown in FIG. 8, the projections 78b extend over an outboard side of the flange 68 (outboard portion 68) of the armrest 14. The breakaway feature 80 has a predetermined level of strength that is sufficient to retain the armrest 14 in the non-impacted orientation during normal usage of the vehicle 10 and the armrest 14. As shown in FIG. 9, in response to an impact force $F_1$ acting from an outboard side of the vehicle 10 on the door 12, the door 12 can deform and be moved in the inboard direction $D_I$. If the armrest 14 contacts a passenger or object within the passenger compartment of the vehicle 10 adjacent to the armrest 14, a counter force $F_2$, is generated acting on the armrest 14. The generation of the counter force $F_2$ causes the breakaway features 80 to breakaway, thereby allowing the armrest 14 to move in the outboard direction $D_O$, and, into a space defined between the trim panel 44 and the inner panel 40. It should be understood from the drawings and the description herein that the inner panel 40 of the door 12 can be provided with an opening or depression (not shown) that allows the armrest 14 to move a greater distance in the outboard direction $D_O$ in response to the counter force $F_2$.

Figure 9:
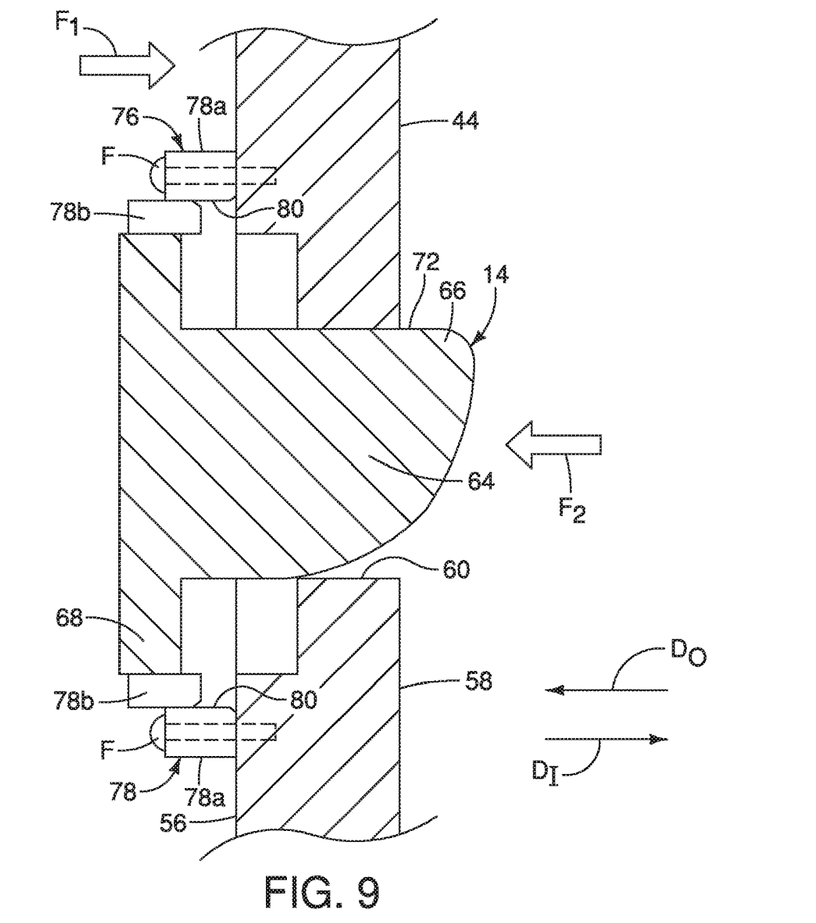
FIG. 9 is another cross-sectional view of the portion of the door shown in FIG. 8, showing the trim panel, the armrest and the retaining elements of the armrest retaining structure with the armrest in an impacted orientation after an impact event in accordance with the first embodiment.

The breakaway feature 80 of each of the projections 78b of the plurality of retaining elements 78 is configured such that in response to a predetermined force, such as the counter force $F_2$, the breakaway features 78b cause the projections 78b to breakaway from the corresponding one of the attachment blocks 78a of the retaining elements 78, as shown in FIG. 9. Hence, the armrest 14 can move in the outboard direction $D_O$ in response to the counter force $F_2$m The breakaway feature 80 can be formed in any of a variety of ways, such as forming the projections 76 of a frangible material that breaks upon application of a counter force $F_2$, shown in FIG. 9. Further, the attachment block 78 (a first portion) and the projection 78b (a second portion) of each of the retaining elements 78 can be made of different materials, joined with an adhesive, or heat staking, in order to provide sufficient strength for the armrest 14 to be used in normal operation of the vehicle 10.

Second Embodiment

Figure 10:
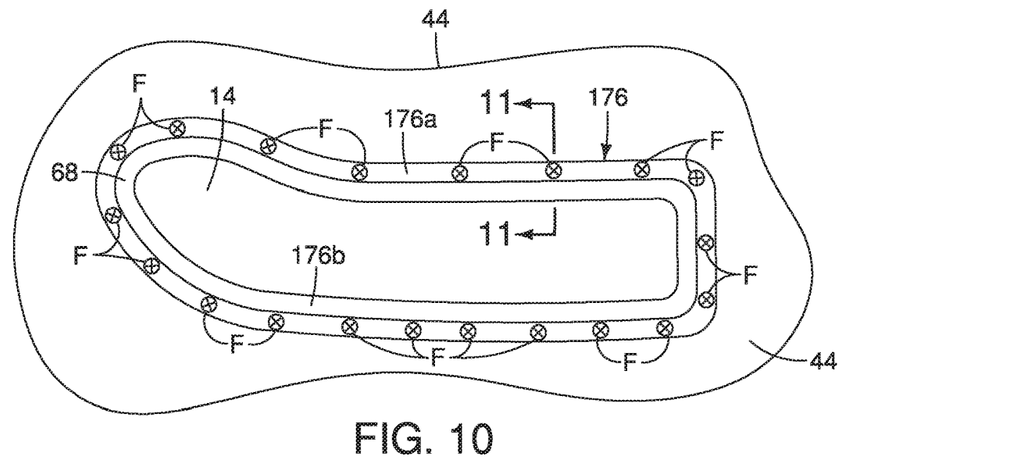
FIG. 10 is a schematic view of an armrest retaining structure and an outboard portion of an armrest defined by a ring-like member having a breakaway feature in accordance with a second embodiment.
Figure 11:
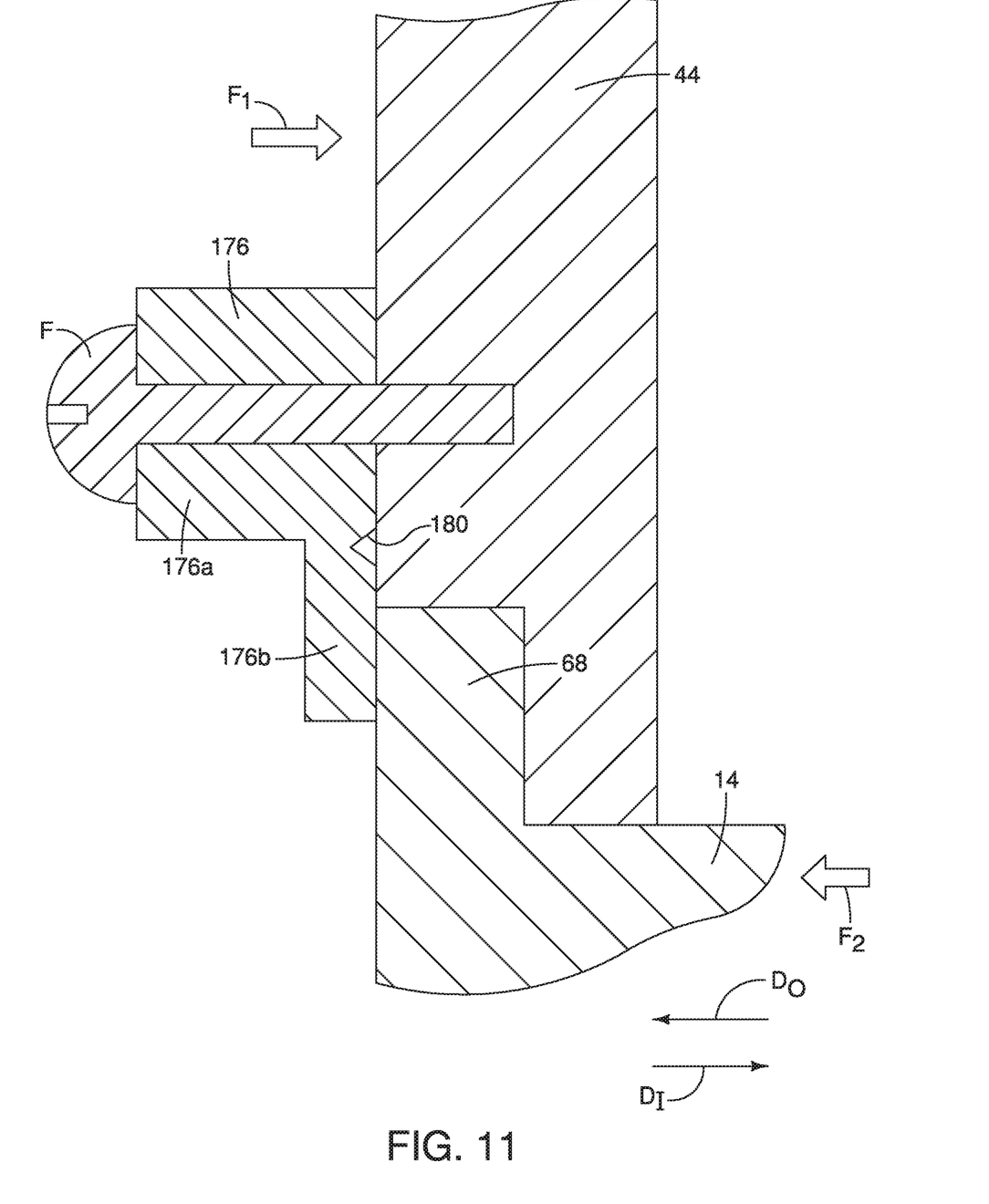
FIG. 11 is a cross-sectional view of the trim panel, the armrest and the armrest retaining structure taken along the line 11-11 in FIG. 10, showing the trim panel, the armrest and the retaining elements of the armrest retaining structure with the armrest in an non-impacted orientation in accordance with the second embodiment.

Referring now to FIGS. 10 and 11, an armrest retaining structure 176 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the door 12, the trim panel 44 and the armrest 14 are as described in the first embodiment above. In the second embodiment, the armrest retaining structure 76 of the first embodiment is replace with the armrest retaining structure 176. The armrest retaining structure 176 is a single element that encircles and conforms to the overall shape of the outer peripheral flange 68 of the armrest 14. The armrest retaining structure 176 can be made of a flexible ring-shaped material that can be shaped to conformed to the overall shape of the outboard portion 68 (flange 68) of the armrest 14.

The armrest retaining structure 176 includes an attachment section 176a and a projecting section 176b. Proximate an intersection of the attachment section 176a and the projecting section 176b a breakaway feature 180 is formed. The breakaway feature 180 is depicted in FIG. 11 as a V-shaped notch that extends continuously around the entire circumferential length of the armrest retaining structure 176. The breakaway feature 180 is configured in a manner consistent with the breakaway features 80 of the first embodiment. Specifically, in response to an impact force $F_1$ acting from an outboard side of the vehicle 10 on the door 12, the door 12 can deform and be moved in the inboard direction $D_I$. If the armrest 14 contacts a passenger or object within the passenger compartment of the vehicle 10 adjacent to the armrest 14, a counter force $F_2$, is generated acting on the armrest 14. The generation of the counter force $F_2$ causes the breakaway features 180 to breakaway from the attachment block 176 of the armrest retaining structure 176, thereby allowing the armrest 14 to move in the outboard direction $D_O$, and, into a space defined between the trim panel 44 and the inner panel 40, as in the first embodiment.

The various vehicle features and vehicle components of the vehicle 10 (other that the armrest 14 and the armrest retaining structures 76 and 176) are conventional components that are well known in the art. Since vehicle features and vehicle components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle assembly. Accordingly, these terms, as utilized to describe the present invention should be interpreted relative to a vehicle equipped with the vehicle assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle assembly, comprising:
an inner door panel;
an outer door panel fixed along at least a portion of an outer periphery thereof to an outer periphery of the inner door panel;
a trim panel attached to an inboard surface of the inner door panel, the trim panel having an outboard surface and an inboard surface, the outboard surface facing the inboard surface of the inner door panel, with a portion of the trim panel defining an armrest opening that extends from the outboard surface to the inboard surface of the trim panel;
an armrest having a main body that includes an inboard portion and an outboard portion, the inboard portion being inserted through the armrest opening from an outboard surface of the trim panel with the inboard portion of the main body extending inboard from the inboard surface of the trim panel, the inboard portion of the arm rest having an arm supporting surface located inboard of the inboard surface of the trim panel, the outboard portion having an outer peripheral flange that overlays a portion of the outboard surface of the trim panel, the outer peripheral flange having at least an upper section and a lower section, the lower section overlaying a corresponding section of the outboard surface of the trim panel and the upper section overlaying a corresponding section of the outboard surface of the trim panel; and
an armrest retaining structure attached to the outboard surface of the trim panel at location adjacent to the armrest opening, the armrest retaining structure retaining the armrest in position relative to the trim panel at the upper section and the lower section of the outer peripheral flange of the armrest, the armrest retaining structure further being configured to release the upper section and the lower section of the armrest for movement in an outboard direction upon application of a predetermined first level of force to the armrest.

2. The vehicle assembly according to claim 1, wherein the armrest retaining structure is a single element that encircles and conforms to the overall shape of the outer peripheral flange of the armrest.

3. The vehicle assembly according to claim 2, wherein the armrest retaining structure includes a breakaway feature such that in response to the predetermined first level of force being applied to the armrest, the breakaway feature moves relative to a remainder of armrest retaining structure such that the armrest is movable in an outboard direction relative to the trim panel.

4. The vehicle assembly according to claim 2, wherein the armrest retaining structure includes a first portion that is attached to the outboard surface of the trim panel, and a second portion that overlays a portion of the outer peripheral flange of the armrest.

5. The vehicle assembly according to claim 4, wherein the second portion of the armrest retaining structure includes a breakaway feature defined by a notch along an outboard surface of the second portion of the armrest retaining structure, the notch having a reduced overall thickness relative to a remainder of the second portion.

6. The vehicle assembly according to claim 1, wherein the armrest retaining structure includes a breakaway feature such that in response to the predetermined first level of force applied to the armrest, the breakaway feature moves relative to a remainder of armrest retaining structure such that the armrest is movable in an outboard direction relative to the trim panel.

7. The vehicle assembly according to claim 1, wherein the armrest retaining structure includes a plurality of retaining elements, each of the plurality of retaining elements being fixed to the outboard surface of the trim panel, each of the plurality of retaining elements having a projection that contacts a corresponding portion of the outer peripheral flange of the armrest.

8. The vehicle assembly according to claim 7, wherein each of the plurality of retaining elements being spaced apart from one another around the outer peripheral flange of the armrest.

9. The vehicle assembly according to claim 7, wherein each of the plurality of retaining elements includes a breakaway feature such that in response to the predetermined first level of force being applied to the armrest, each of the breakaway features moves relative to a remainder of armrest retaining structure such that the armrest is movable in an outboard direction relative to the trim panel.

10. The vehicle assembly according to claim 1, wherein the inboard portion of the main body is dimensioned to conform to the overall shape of the arm rest opening.

11. A vehicle assembly, comprising:
a vehicle body structure that defines a door opening;
a door installed to the vehicle body structure such that in a closed orientation, the door covers the door opening, the door having:
an inner door panel;
an outer door panel fixed to an outer periphery of the inner door panel;
a trim panel attached to the inner door panel, the trim panel having an outboard surface and an inboard surface, a portion of the trim panel defining an armrest opening that extends from the outboard surface to the inboard surface of the trim panel;

an armrest having a main body that includes an inboard portion and an outboard portion, the inboard portion being inserted through the armrest opening from an outboard surface of the trim panel with the inboard portion of the main body extending inboard from the inboard surface of the trim panel, the inboard portion of the arm rest having an arm supporting surface inboard of the inboard surface of the trim panel, the outboard portion having an outer peripheral flange that overlays a portion of the outboard surface of the trim panel; and an armrest retaining structure attached to the outboard surface of the trim panel at locations adjacent to the armrest opening, the armrest retaining structure retaining the armrest in position relative to the trim panel, the armrest retaining structure further being configured to release the armrest for movement in an outboard direction upon application of a predetermined first level of force to the armrest, the armrest retaining structure being a single element that encircles and conforms to the overall shape of the outer peripheral flange of the armrest.

12. The vehicle assembly according to claim 11, wherein the armrest retaining structure includes a breakaway feature such that in response to the predetermined first level of force being applied to the armrest, the breakaway feature moves relative to a remainder of armrest retaining structure such that the armrest is movable in an outboard direction relative to the trim panel.

13. The vehicle assembly according to claim 11, wherein the armrest retaining structure includes a first portion that is attached to the outboard surface of the trim panel, and a second portion that overlays a portion of the outer peripheral flange of the armrest.

14. The vehicle assembly according to claim 13, wherein the second portion of the armrest retaining structure includes a breakaway feature defined by a notch along an outboard surface of the second portion of the armrest retaining structure, the notch having a reduced overall thickness relative to a remainder of the second portion.

15. The vehicle assembly according to claim 11, wherein the armrest retaining structure includes a breakaway feature such that in response to the predetermined first level of force applied to the armrest, the breakaway feature moves relative to a remainder of armrest retaining structure such that the armrest is movable in an outboard direction relative to the trim panel.

16. The vehicle assembly according to claim 11, wherein the armrest retaining structure includes a plurality of retaining elements, each of the plurality of retaining elements being fixed to the outboard surface of the trim panel, each of the plurality of retaining elements having a projection that contacts a corresponding portion of the outer peripheral flange of the armrest.

17. The vehicle assembly according to claim 16, wherein each of the plurality of retaining elements being spaced apart from one another around the outer peripheral flange of the armrest.

18. The vehicle assembly according to claim 16, wherein each of the plurality of retaining elements includes a breakaway feature such that in response to the predetermined first level of force being applied to the armrest, each of the breakaway features moves relative to a remainder of armrest retaining structure such that the armrest is movable in an outboard direction relative to the trim panel.

19. The vehicle assembly according to claim 11, wherein the inboard portion of the main body is dimensioned to conform to the overall shape of the arm rest opening.

\* \* \* \* \*